Aug. 18, 1964 M. P. HARWOOD 3,144,804
ANCHORING STRUCTURE FOR RELEASABLE FASTENER PINS
Filed June 30, 1961

INVENTOR.
MALCOLM P. HARWOOD
BY
R. E. Geauque
ATTORNEY

United States Patent Office 3,144,804
Patented Aug. 18, 1964

3,144,804
ANCHORING STRUCTURE FOR RELEASABLE
FASTENER PINS
Malcolm P. Harwood, North Hollywood, Calif., assignor to Wedgelock Corporation of California, North Hollywood, Calif., a corporation of California
Filed June 30, 1961, Ser. No. 121,212
1 Claim. (Cl. 85—81)

This invention relates to an anchoring means and more particularly to a means for anchoring a pair of elongated pins in an enlarged head of a stud member as, for example, an axially movable stud of a releasable fastener for retracting and protracting the pins relative to a body of the fastener.

More specifically, this invention provides a new and improved means for anchoring a pair of elongated pins of a releasable fastener to the axially movable stud thereof so as to be axially movable with the stud for preventing loosening of the pins relative to the stud in response to constant and repeating axial loads applied to the outer ends of the pins during use. This invention may be advantageously applied to many applications wherein a pair of elongated pins are anchored in a stud member and in which the pins are subjected to excessive and repeating axial loads. However, a specific application is herein illustrated and described to exemplify the use of the invention more clearly. It will therefore be appreciated that the invention is not to be limited to the example cited herein but that it will have other applications which will be more apparent by those skilled in the art as suggested by the drawings and description.

The example herein cited is that of a releasable fastener having a pair of work-engaging pins anchored in a stud movably mounted in the body of the fastener for non-rotating movement relative to the body so as to grip a work piece between outer ends of the pins and a work-engaging end of the body in response to axial movement of the stud in one direction. The stud of the fastener is retracted and protracted by either manually operated means in the form of a hand wrench or the like or by power-operated, nut runner tools or attachments which actuate a nut engaged with a threaded portion of the stud and are coactive with the body of the fastener to retract the pins at an increased speed.

Although the powered nut runner tools or attachments usually include a torque limiting means by which a predetermined torque may be applied to the nut, considerable shock and load is applied to the stud member when the pins are caused to retract so as to clamp a work piece between the enlarged outer ends and a work-engaging surface of the body of the fastener which tends to pull the pins outwardly of an enlarged head of the stud member, thereby resulting in either pulling the pins completely outwardly of the stud or loosening them to a point where they are inoperative or less efficient.

This invention, on the other hand, provides for improving the anchoring means securing the pins within the enlarged head of the stud member for more efficiently resisting the axial loads applied thereto for preventing loosening of the anchor means or removal of the pins from the head. Formerly, the inner ends of the pins were inserted into a blind bore of the head of the stud member and the exterior of the head swaged so as to grip the inner ends of the pins. In such installation, considerable free space remained in the interior of the blind bore after the swaging operation thus creating less than full friction between the inner wall of the head and the exterior of the inner ends of the pins. A further central space was formed by offsetting portions of the inner ends of the pins so as to form radial shoulders on the inner pins engageable with an annular flange formed in response to the swaging operation which was intended to resist axial forces tending to pull the pins outwardly from the enlarged head. This invention, on the other hand, provides outer configurations on the inner ends of the pins which are designed to completely fill the area within the blind bore when the pins are juxtaposed within the blind bore and the enlarged head is swaged thereover to form the flange-engaging shoulders. Furthermore, the space formed by the offset portion of the inner ends of the pins is occupied by a key having portions on each side of its median residing in opposing grooves formed by the opposing offsets of the inner ends so as to fill the space and prevent collapse of the offset portions which might result in loosening or pulling out of the inner ends. The key is formed to have a length substantially equal to the diameter of the blind bore so as to completely fill the space formed by the grooves. The outer ends of the key are configurated so as to be complementary to the interior of the bore and provide additional friction with the interior of the blind bore for further resisting movement of the inner ends juxtaposed therein.

It is therefore an object of this invention to provide a new and improved anchoring means for a pair of pins anchored in a blind bore of a stud member which prevents loosening of the inner ends within the bore or pulling out thereof in response to axial loads placed against the pins.

It is another object of this invention to provide an anchoring means which is readily adaptable to present assembly and manufacturing means and methods.

A general object of this invention is to provide a new and improved anchoring means of the character described which overcomes disadvantages of prior means and methods heretofore intended to accomplish generally similar purposes.

These and other objects of this invention will be more apparent from the ensuing detailed descripton, drawings and appended claim.

Figure 1:
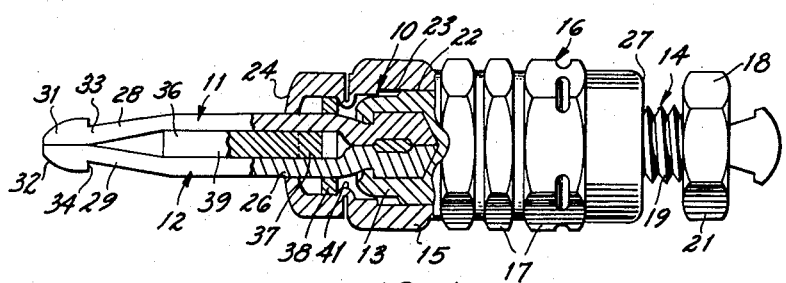
FIGURE 1 is a side view, in elevation, of a fastener having embodied therewith an anchoring means of this invention, with parts shown in cross section for greater clarity.
Figure 2:
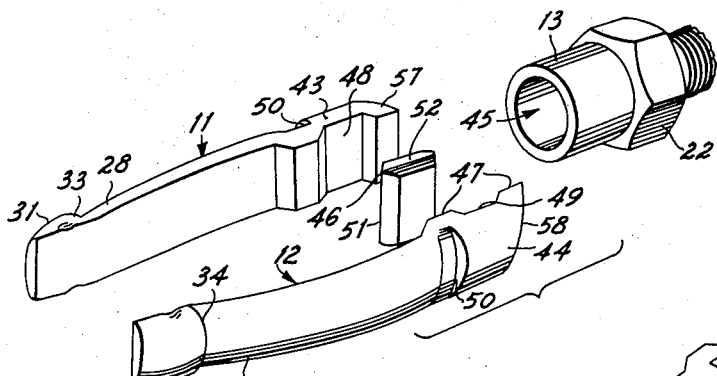
FIGURE 2 is an enlarged perspective view, in elevation, illustrating the components of the anchoring means thereof in exploded relationship.

Referring in detail to the drawings, there is shown by way of illustration, but not of limitation, an anchoring means 10 designed and constructed in accordance with this invention and exemplified as anchoring a pair of elongated pins 11 and 12 in an enlarged head 13 of a stud member 14 axially movable in a body 15 of a releasable fastener device generally designated by the numeral 16.

As mentioned above, the anchoring means is applicable to other applications and the releasable fastener 16, illustrated herein, is shown as an example to illustrate the invention, but is not to be limited thereto except as in combination with the invention per se.

In general, the fastener 16 comprises the body 15 having a non-circular, tool-engageable outer configuration, as for example, the hexagonal outer surfaces 17 herein illustrated, so as to adapt to the body 15 to be non-rotatably held either manually or as by a powered nut runner attachment, more specifically, an outer sleeve thereof (not shown) having an inner configuration complementary to the configuration 17. The stud member 14 is movably mounted in the body 15 for axial movement relative thereto. A nut member 18 is threadably engaged with external threads of a shank 19 of the stud member 14, the nut means 18 having a non-circular, tool-engageable outer configuration indicated by the numeral 21 adapted to be engaged by an inner, rotatable sleeve (not shown) of the nut runner for axially moving the stud member 14 in response to rotation of the nut means 18 in one direction.

The stud member 14 is keyed to the interior of the body 15 by the enlarged head 13 having a non-circular portion 22 complementary to a non-circular inner bore 23 of the body 15. One end 24 of the body 15 is closed and serves as a work-engaging surface, the end 24 having an opening 26 extending therethrough for a purpose to be hereinafter described. The opposite end 27 of the body 15 is open and is provided with an annular bearing (not shown) through which the shank 19 of the stud member 14 is axially movable. The work-engaging pins 11 and 12 are each secured at inner ends thereof to the head 13 for axial movement therewith, by the anchoring means 10. The pins 11 and 12 are in spaced substantially parallel relationship, having outer ends converging as indicated at 28 and 29, respectively, which are enlarged at their outer extremities or tips 31 and 32, respectively, to provide inwardly facing shoulders 33 and 34, respectively. In the normal position of FIGURE 1, the tips 31 and 32 are biased into juxtaposition so as to form a substantially spherical exterior insertable through aligned apertures of two or more sheets or workpieces (not shown).

A spreader means 36, as best seen in FIGURE 1, is T-shaped in configuration and is interposed between the spaced portion of the pins 11 and 12 with its crossarm 37 disposed within the body 15, between the closed end 24 and a retaining washer 38 and its central arm 39 extending through the opening 26 and between the pins 11 and 12. The spreader 36 is held in this position by an internal annular flange 41 backing the washer 38 so as to prevent axial movement thereof.

As will now be more clearly understood from the foregoing description, the stud 14 is keyed to the body 15 by a sliding engagement of the head portion 13 in the bore 23 so as to protract or retract the pins 11 and 12 secured to the head 13. When the stud member 14 is bottomed in the body 15, pins 11 and 12 have their outer enlarged ends 31 and 32 juxtaposed and insertable through the aperture of the workpiece. In response to rotation of the nut means 18 in one direction, the stud member 14 is axially retracted to the right, as viewed in FIGURE 1, to retract the pins 11 and 12 through the opening 26 of the work-engaging closed end 24. The central arm 39 of the T-shaped spreader means 36 acts upon the convergent portions 28 and 29 of the pins to spread the ends 31 and 32 apart and increase the combined outer configuration to one larger than the openings of the workpieces and abut the outer surface of the outermost workpiece by the shoulders 33 and 34. When fully retracted, the pins 11 and 12 clamp the workpieces between the workpiece engaging closed end 24 of the body and the shoulders 33 and 34 of the pins.

Although in the past, the pins like 11 and 12 have been anchored in a head like 13 by insertion of the inner ends 43 and 44 respectively thereof within a blind bore of the enlarged head and swaging the exterior of the enlarged heads so as to clamp the inner ends for anchoring thereof, it has been found more satisfactory and therefore the subject of this invention, to form the inner ends 43 and 44 in such manner that when juxtaposed together in the interior they are completely complementary to the interior of the blind bore without leaving any cavities in the interior which would permit relative movement of the inner ends 43 and 44 within the bore generally designated by the numeral 45. The inner ends 43 and 44 of the pins 11 and 12, respectively, are each semicircular in cross section with opposing relatively flat axial faces 46 and 47 which, when the inner ends 43 and 44 are juxtaposed in face-to-face relationship in the blind bore 45, form a substantially cylindrical configuration complementary to and fitting snugly in the blind bore 45. In this manner, the cylindrical portion of the ends completely fill the interior of the bore 45 with the exception of opposing transverse grooves 48 and 49 defined in the ends 43 and 44 respectively.

Figure 3:
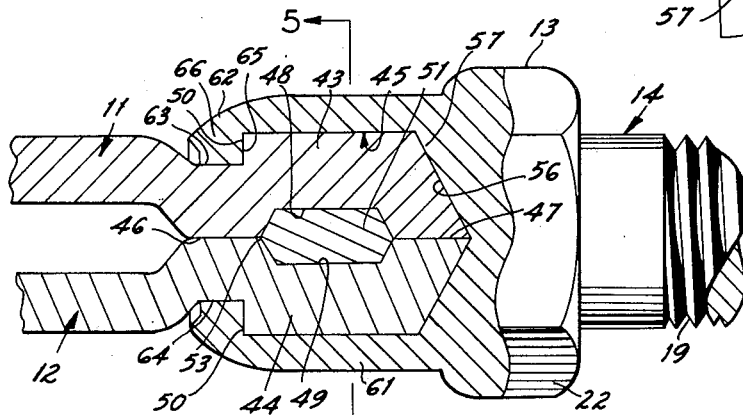
FIGURE 3 is an enlarged, vertical, cross-sectional view as taken substantially through the center of an intermediate portion of FIGURE 1, with parts shown in elevation.
Figure 5:
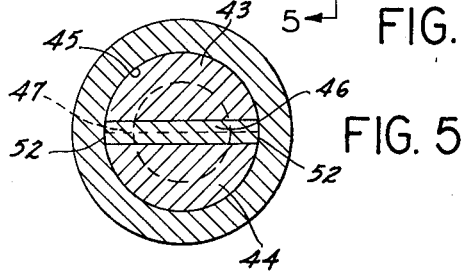
FIGURE 5 is a vertical, cross-sectional view as taken substantially along the line 5—5 of FIGURE 3.

In practice, it has been found more convenient and practicable to form the semi-circular surfaces of the ends and a radial shoulder 50 on each end by displacing the material by forging, pressing, or the like, to the configuration as seen in FIGURE 3 thus forming, as a result, the transverse grooves 48 and 49. The pins in the past have been similarly formed presenting the disadvantage of space between the ends of 43 and 44 in which material may flow when an axial force is applied to the pins 11 and 12 acting to pull them outwardly of the head 13. To prevent such action, a key or slug 51 is dimensioned to snugly fit the juxtaposed grooves 48 and 49 when the pins are in the blind bore and fill the space completely, with arcuate ends 52 complementary to the interior of the bore 45 to eliminate any space between the pins. Further, the median 53 of the key 51 is substantially coplanar with the faces 46 and 47 so that the portion of the key on one side of the median 53 fills the groove 48 whereas the portion of the key 51 on the other side of the median 53 fills the groove 49 thereby eliminating any tendency for the ends 43 and 44 to slide one relative to the other on the faces 46 and 47.

Figure 4:
FIGURE 4 is a fragmentary, perspective view, illustrating the inner end of one of the pins thereof.

To completely fill the blind bore, particularly in the area of the conical blind end 56 of the bore, the outer tips of each end 43 and 44 is semi-conically configurated as indicated at 57 and 58 and best seen in FIGURE 4 which, when the ends are juxtaposed in the blind bore, substantially fill the conical blind end 56.

To anchor the ends 43 and 44 within the head 13, the ends 43 and 44 are juxtaposed together with the faces 46 and 47 in face-to-face relationship and with the key 51 inserted in the space formed by the grooves 48 and 49. The ends 43, 44 are then inserted into the blind bore 45 and the forward end of the tubular wal 61 defined by the blind bore 45 is swaged or otherwise deformed to taper or round the forward end of the wall, as designated at 62, and thereby cause material to flow into the opposed grooves 63 and 64 spaced equally from the tips of the ends 43 and 44, respectively. The material flowed defines an annular, inwardly extending flange 66 abutting the radial shoulders 50 of the inner ends. At the same time, the entire wall 61 is swaged inwardly to tightly grip the outer surfaces of the ends 43 and 44 including the semi-conical surfaces 57 and 58 and the arcuate end surfaces 52 of the key 51. In this manner, a high coefficient of friction is created between the component parts inserted within the blind bore 45 and the internal surface of the bore whereas the annular flange 66 abuts the shoulders 50 to resist axial forces placed thereagainst in response to an axial force placed on the pins 11 and 12 acting to separate the pins from the head 13.

While there is herein shown and described this invention in what is conceived to be the most practical and preferred embodiment of this invention, it is to be understood that alterations and modifications thereof may be made in a manner to satisfy the spirit of this invention which is intended to comprehend any and all equivalent devices as comprehended in the following claim.

What is claimed as new and desired to secure by Letters Patent is:

In a releasable fastener including a body having a work-engaging closed end and an axial opening extending through said closed end, stud means movably mounted in said body for non-rotating axial movement relative to said body, said stud means having an enlarged head at one end thereof and a shank, means defining a blind bore in one end of said head opposed from said shank, a pair of spaced, elongated, work-engaging pins, each said pin having inner and outer ends, an intermediate portion extending outwardly of said body through said axial opening thereof, and enlarged outer tips, said outer ends of said pins being angularly disposed relative to each other so as to converge at their said outer tips, the improvement comprising:

an annular internal flange integral with said head and adjacent to the open end of said blind bore of said head and engaging opposing external radial shoulders defined on said inner end of each of said pins;

said blind bore including a cylindrical portion terminating in a conical blind end;

said inner end of each of said pins being semi-circular in cross section and including a relatively flat axial face and a semi-conical tip, said inner ends being juxtaposed in face-to-face relationship in said blind bore so as to define together a cylindrical exterior complementary to the cylindrical portion of said blind bore and the semi-conical tip complementary to the conical end of said blind bore;

a transverse groove intersecting said relatively flat face of each of said inner ends of said pins and extending from side to side of said faces, said grooves being equally spaced from the tips of said ends, said grooves having sloped side walls and substantially flat bottom walls, said bottom walls extending substantially parallel to said flat faces; and key means residing in said transverse grooves with a portion of one side of a longitudinal median of said key means residing in one of said grooves and a portion on an opposite side of said median residing in the other of said grooves, said key means having sloped side walls to cooperate with the sloped side walls of said grooves.

References Cited in the file of this patent
UNITED STATES PATENTS

| | | |
|---|---|---|
| 946,286 | Sweetland | Jan. 11, 1910 |
| 2,368,967 | Mancini | Oct. 16, 1945 |
| 2,387,371 | Wallace | Oct. 23, 1945 |
| 2,775,155 | Tompkins | Dec. 25, 1956 |